United States Patent [19]

Anderson et al.

[11] 4,393,987

[45] Jul. 19, 1983

[54] SUPERPLASTICALLY FORMED STRUCTURE AND METHOD OF MAKING

[75] Inventors: Charles N. Anderson, Kent; Samuel D. Elrod, Seattle; Gerald O. Miller, Kent, all of Wash.

[73] Assignee: The Boeing Company, Seattle, Wash.

[21] Appl. No.: 307,039

[22] Filed: Sep. 30, 1981

[51] Int. Cl.³ .............................................. B23K 31/02
[52] U.S. Cl. ................................................... 228/157
[58] Field of Search .................... 228/157, 182, 263 J; 156/197; 428/198; 29/455 LM, 157.3 D; 52/785, 634, 693; 244/123, 131, 132

[56] References Cited

U.S. PATENT DOCUMENTS

| | | | |
|---|---|---|---|
| 3,000,088 | 9/1961 | Melzer | 29/455 LM X |
| 3,713,207 | 1/1973 | Ruckle et al. | 228/263 J X |
| 3,769,101 | 10/1973 | Woodward | 228/263 J X |
| 3,924,793 | 12/1975 | Summers et al. | 228/157 |
| 3,927,817 | 12/1975 | Hamilton et al. | 228/157 |
| 4,010,530 | 3/1977 | Delgrosso et al. | 228/263 J X |
| 4,284,443 | 8/1981 | Hilton | 156/197 X |

FOREIGN PATENT DOCUMENTS

746648 3/1956 United Kingdom ........ 228/263 J X

OTHER PUBLICATIONS

John Inskeep, James A. McMaster, Christopher A. Trumbell, *Move Over for Titanium*, Apr. 1977, Welding Design & Fabrication.

Metals Handbook, 8th Edition, *The Selection of Titanium Alloys for High-Temperature Aeronautical Service*, by the ASM Committee on Titanium.

*Thermodynamic Data on Some Elements and Compounds Encountered in Ferrous Metallurgical Processes*, The Making, Shaping and Treating of Steel, Ninth Edition, by United States Steel.

*Thermal Conductivity of Certain Metals*, Handbook of Chemistry and Physics, 50th Edition, by the Chemical Rubber Company.

*Primary Examiner*—Nicholas P. Godici
*Assistant Examiner*—M. Jordan
*Attorney, Agent, or Firm*—Morris A. Case; B. A. Donahue

[57] ABSTRACT

A superplastically formed structure is prepared from a grid patterned core material that is joined to a plate by diffusion bonding or by welding to alternate joint locations on one side and at each of the other joint locations to a plate on the other side of the core. The joined core and plates are then formed by superplastic forming.

13 Claims, 16 Drawing Figures

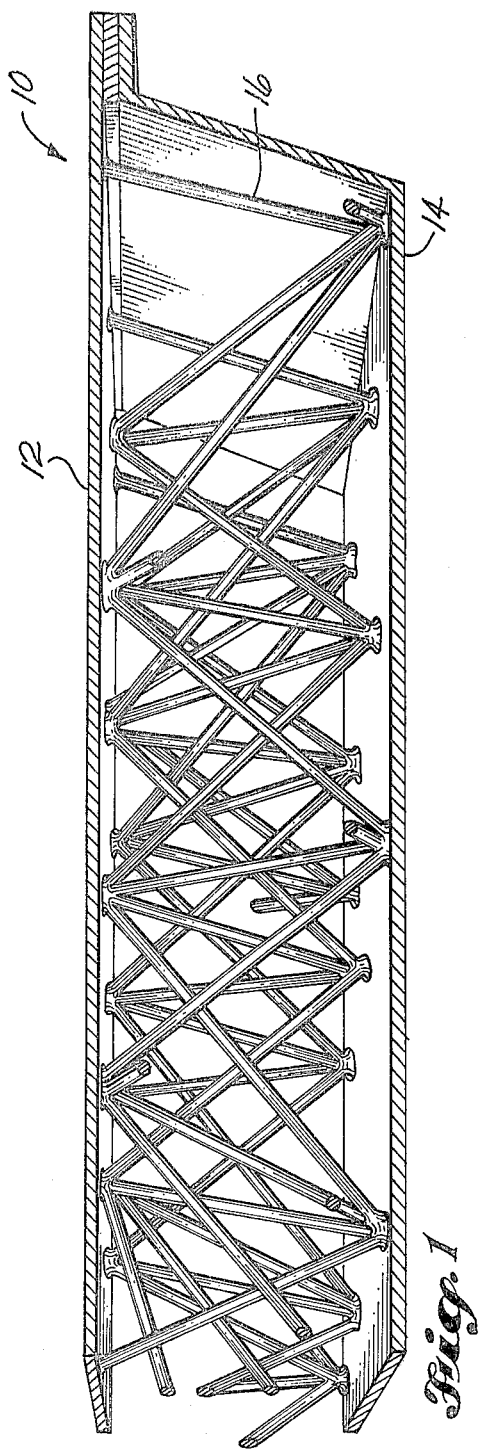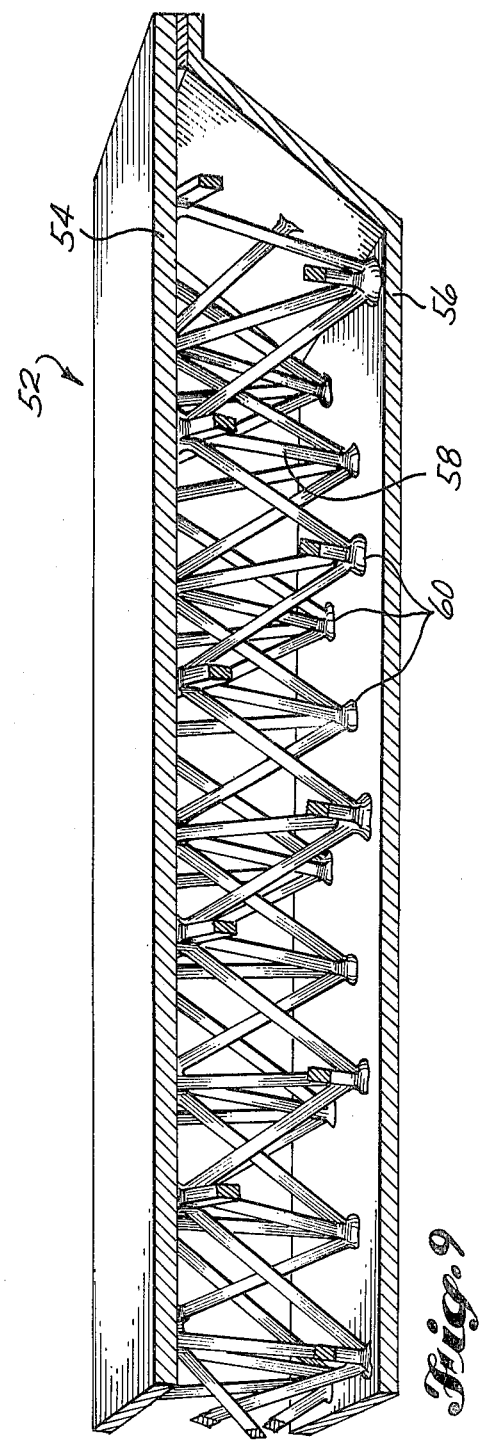

SUPERPLASTICALLY FORMED STRUCTURE AND METHOD OF MAKING

BACKGROUND OF THE INVENTION

Diffusion bonding at selected points between three sheets of material followed by introducing inert gas between the sheets while held at superplastic forming temperatures makes a lightweight structure with formed outer sheets and the inner sheet acting as a reinforcing core extending between the outer sheets.

SUMMARY OF THE INVENTION

A grid patterned core is joined at opposite sided alternate grid intersections to face sheets and the sheets with joined core superplastically formed into a lightweight structure.

DESCRIPTION OF THE DRAWINGS

FIG. 1 shows a fragmented perspective view of the structure of this invention.

FIG. 9 shows a fragmented perspective view of a structure of a different embodiment of this invention.

DETAILED DESCRIPTION

Lightweight superplastically formed structure 10 is made up of an upper face sheet or plate 12, a lower face sheet or plate 14, and a grid patterned core material 16. These materials are all from metal alloys having superplastic characteristics to permit forming the structure while at an elevated temperature in the superplastic forming range. Various alloys may be formed in the superplastic state with a titanium alloy preferred due to its lightweight and high temperature resistance.

Figure 2:
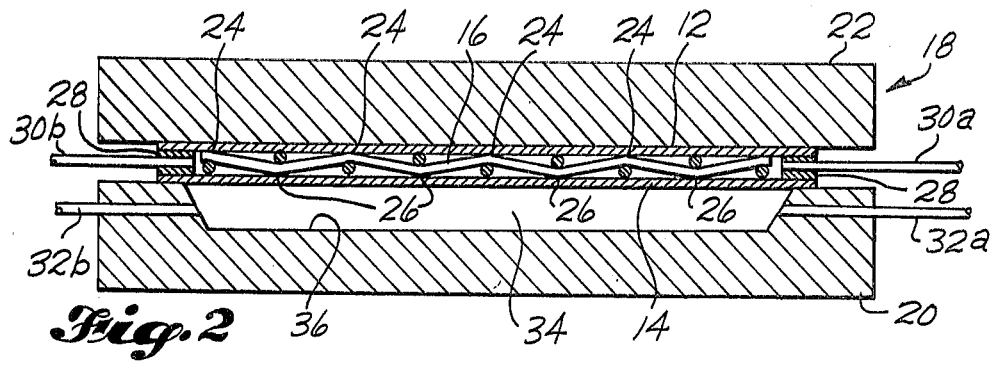
FIG. 2 shows a side elevational sectional view of the invention of FIG. 1 in a mold prior to forming.
Figure 3:
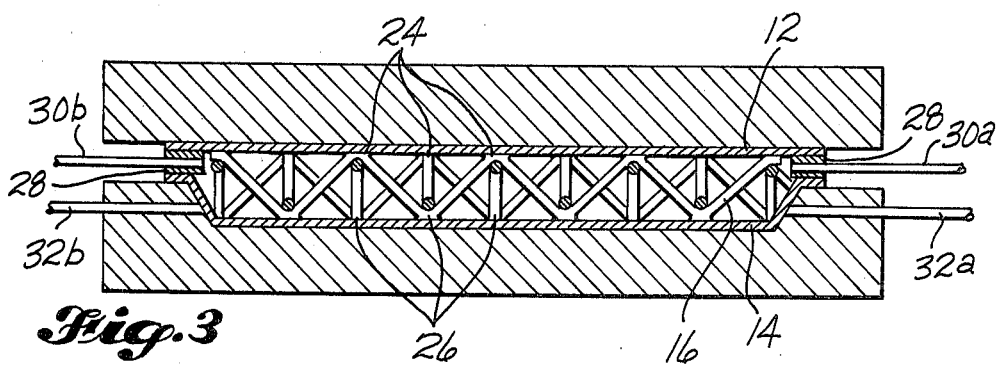
FIG. 3 shows the view of FIG. 2 with the structure formed.
Figure 4:
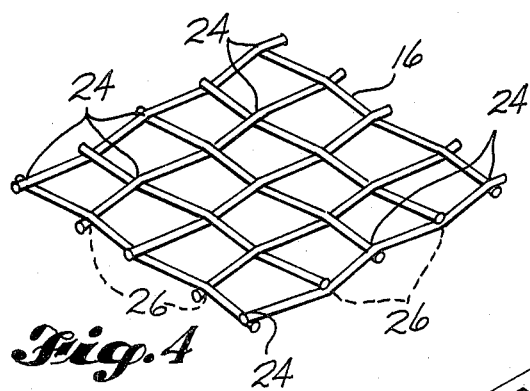
FIG. 4 shows a fragmented perspective view of the core of FIG. 1 prior to forming into the structure.
Figure 10:
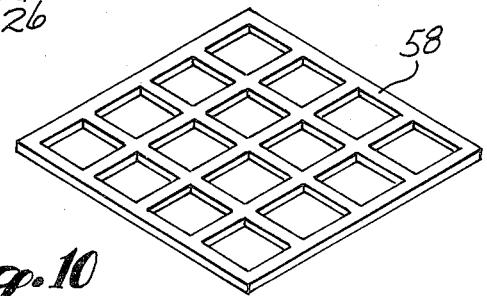
FIG. 10 shows a fragmented perspective view of the core of FIG. 9 prior to forming into the structure.
Figure 5:
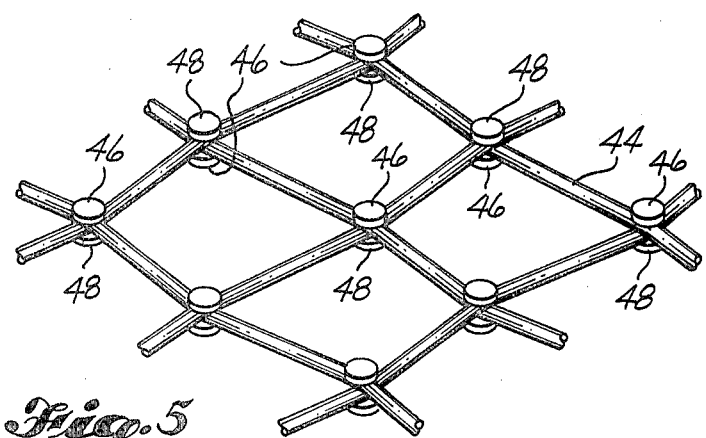
FIG. 5 shows a different embodiment of the core of FIG. 4.
Figure 6:
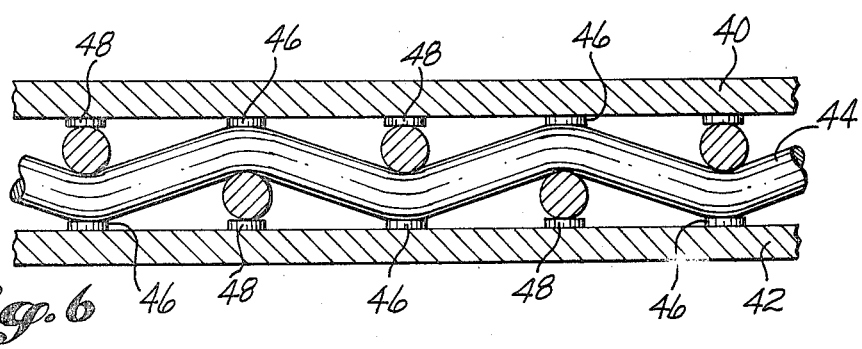
FIG. 6 shows a fragmented side elevational view of the core in FIG. 5 between face sheets and prior to forming.
Figure 7:
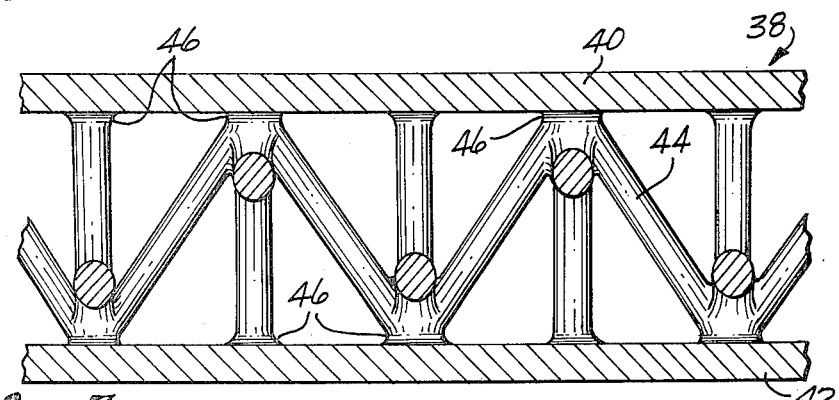
FIG. 7 shows the view of FIG. 6 but after the part is formed.
Figure 8:
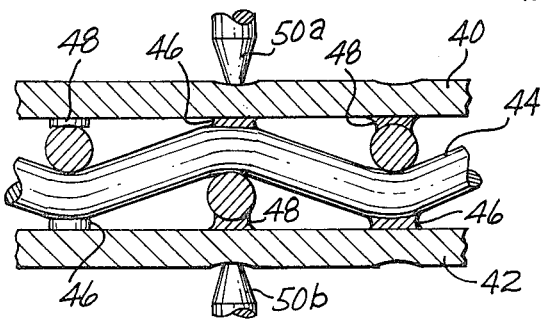
FIG. 8 shows a partial view of FIG. 6 showing welding electrodes.
Figure 11:
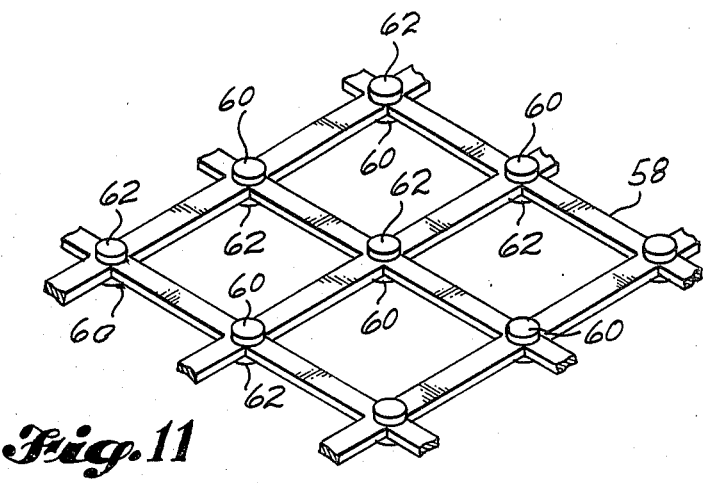
FIG. 11 shows a different embodiment of the core of FIG. 10.
Figure 12:
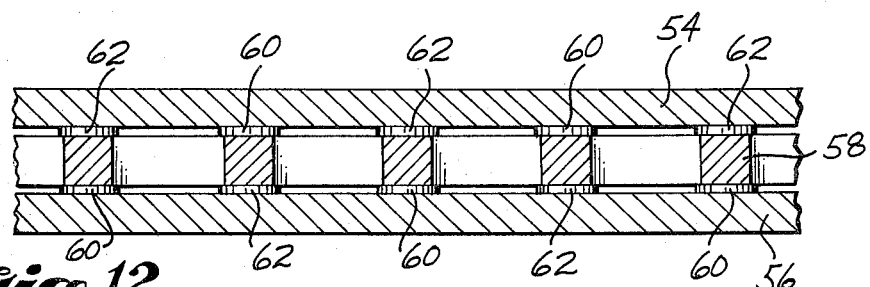
FIG. 12 shows a fragmented side elevational view of the core of FIG. 11 between face sheets and prior to forming.
Figure 13:
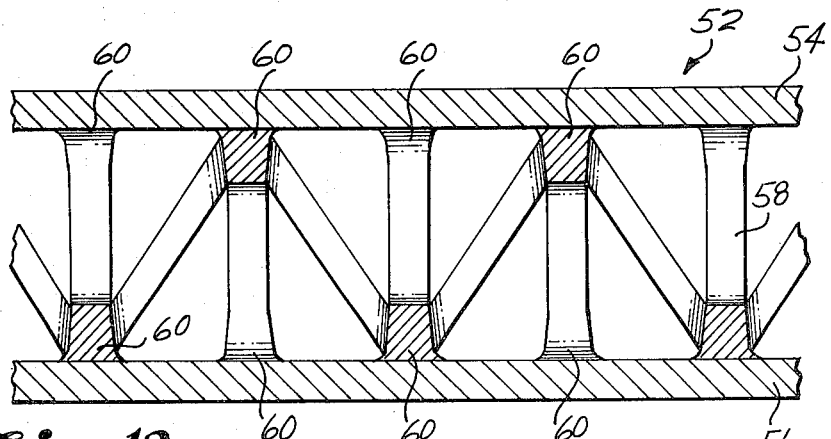
FIG. 13 shows the view of FIG. 12 but after the part is formed.

FIG. 4 shows the core 16 as it looks prior to formation into the structure 10. The grid patterned core is a wire mesh that in FIG. 2 is shown located between the face sheets 12 and 14 to make up an assembly which is placed in a mold 18 made up of formed lower mold 20 and upper cover 22.

The core is preferably resistance spot welded at the intersections and treated with a stop-off compound prior to being placed between the cover sheets with the stop-off covering the core at all places except at alternate crossover joints 24 adjacent the top cover sheet, and alternate crossover joints 26 adjacent the bottom cover sheet. This localized heating of the core material, at the grid intersection, prior to covering with the stop-off compound, converts the metal at the intersection to a Widmanstatten grain structure. Spacers 28 of alloys of the superplastic material are located on each side to permit introduction of an inert gas through line 30a and 30b. The mold also has lines 32a and 32b for introduction of gas into the mold volume at 34.

The assembly is placed in the mold and inert gas introduced to purge the air from the mold. Then the mold is raised to and held at the diffusion bonding temperature to diffusion bond the core at each location where the stopoff compound was not applied. Next, the pressure of the inert gas is raised through line 30a, and with the mold assembly at the superplastic forming temperature face plate 14 moves down to surface 36 taking the joined connections 26 of the core 16 with it to form a truss type member 10.

FIGS. 5 through 8 show a different embodiment of the invention. In this embodiment the superplastically formed titanium structure 38, has upper face plate 40, lower face plate 42, a grid patterned wire core 44, a titanium shim 46 at alternate core joint locations on one side and at each of the other joint locations on the opposite side of the core, and an aluminum shim 48 at the opposite side of the core joints from each titanium shim. In making up the assembly with cover sheets, core and shims the core is placed between the cover sheets with the shims preferably tack welded in place and spot welding electrodes 50a and 50b placed over each joint and each joint is welded together. In another preferred method of joining the core to the face plates, the core is first spot welded to the lower face plates at each intersection where the titanium shims contact that face plate. Aluminum shims are then inserted between the core and the lower face plate at the unwelded intersections, the upper face plate placed over the core, and the previously unwelded intersections are welded between the welding electrodes. It is not required to use the aluminum shims between the upper plate and the core when welding the cover plates to the core by this two step process. The side of the welded joint having the titanium shims will remain welded when the part is superplastically formed. The aluminum shims each provide a path for the electrical energy when spot welding, and convert to titanium aluminide; which readily separates under the conditions when the part is being superplastically formed to destroy any attachment on the aluminum side of the joint. When the joints are being spot welded, the titanium is heated to create a Widmanstatten microstructure. This microstructure in the area of the joint adds a stiffness to prevent deformation of the core and face plates at the joints during superplastic forming.

FIGS. 9 through 13 show yet another embodiment. In this embodiment the superplastically formed titanium structure 52, has upper plate 54, lower plate 56, a grid patterned core 58 prepared from a sheet or plate, a titanium shim 60 at alternate core intersection locations on one side and at each of the other intersections on the opposite side of the core, and an aluminum shim 62 at the opposite side of the intersections from each titanium spacer. The intersections are each spot welded to permanently join the core to the plate at each location having a titanium spacer, and the structure formed by superplastic forming, at which time the core and plate separate at each intersection having an aluminum spacer.

Welding of the core to the cover plates may be accomplished by welding both plates to the core by the one step method; or first welding the core to the lower plate then to the upper plate by the two step method.

Figure 14:
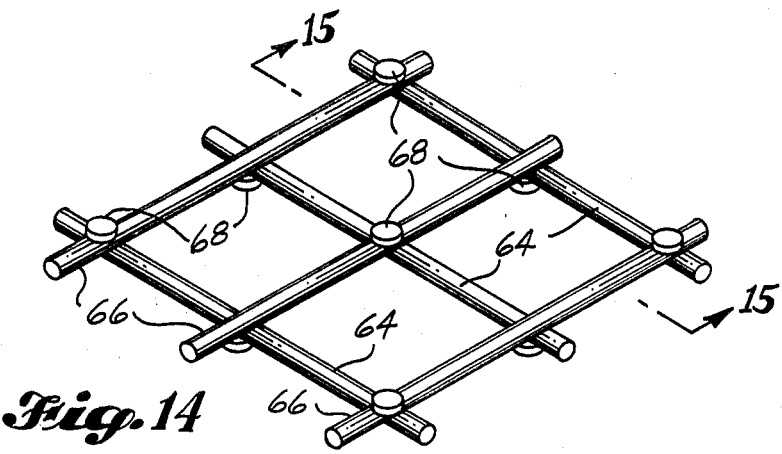
FIG. 14 shows a fragmented perspective view of yet another core.
Figure 15:
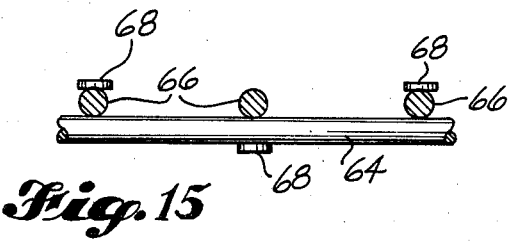
FIG. 15 shows a sectional view taken along line 15—15 of FIG. 14.
Figure 16:
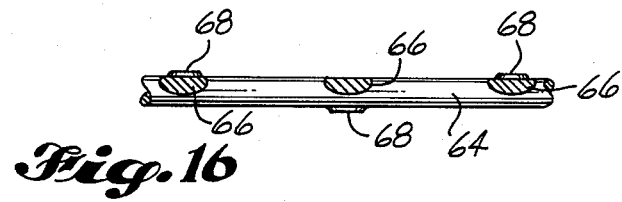
FIG. 16 shows the section of FIG. 15 after resistance welding the joints.

FIGS. 14 through 16 show yet another core that is superplastically formed into a truss structure using the methods as set out above. In this embodiment titanium wires 64 are laid out parallel to each other. Then a line of parallel titanium wires 66 are set at an angle of 90 degrees to the first wires, placed on top, and tack welded at each joint. This core may be used for diffusion bonding and superplastic forming. However, it is preferred the core have titanium spacers 68 at alternate joint locations on one side and at each other joint location on the opposite side, and that each joint location then be spot welded together while under pressure to flatten the core and merge the joints as shown in FIG. 16.

We claim:

1. A method of superplastically forming a reinforced panel, with steps comprising: placing a grid patterned core material onto a titanium sheet, locating an aluminum shim between the core and the sheet at alternate grid intersections, spot welding the core to the sheet at each intersection not having an aluminum shim, placing a titanium sheet over the core and spot welding them together at each grid intersection having an aluminum spacer, raising the temperature into superplastic forming range and introducing an inert gas under pressure between the sheets moving the sheets apart and forming a panel reinforced with the core material joined at alternate intersections to opposite face sheets.

2. A method of superplastically forming a reinforced panel as in claim 1, with the additional step of selecting the core material of a wire mesh.

3. A method of superplastically forming a reinforced panel as in claim 1 with the additional steps of selecting the core material of a solid sheet and machine forming the sheet into the grid pattern.

4. A method of superplastically forming a reinforced panel as in claim 1, with further steps comprising: laying out a first set of wires parallel to each other, placing a second set of wires on top of and at 90 degrees from the direction of the first set of wires, spot welding and pressing the wires together at each intersection to form a flattened grid patterned core.

5. A method of superplastically forming a reinforced panel as in claim 4, with further steps of placing a titanium shim at alternate wire join locations on one side of the core and at each of the other wire join locations on the opposite side of the core, and tack welding the shims to the core prior to assembling.

6. A method of superplastically forming a reinforced panel as in claim 1 with the further step of placing titanium shims between the core and the face sheets at each join location prior to spot welding.

7. A welding of superplastically forming a reinforced panel, with steps comprising: placing a grid patterned core material between a pair of titanium sheets, locating an aluminum shim at each alternate grid intersection on one side of the core and an aluminum shim at the balance of the grid intersections on the other side of the core, spot welding each grid intersection, raising the temperature into superplastic forming range and introducing an inert gas under pressure between the face sheets and moving the sheets apart with the core material joined at each grid intersection on the side of the core not having the aluminum shims to form a reinforced panel.

8. A method of superplastically forming a reinforced panel as in claim 7 with further steps of locating a titanium shim at each grid intersection on the side of the core opposite each aluminum shim prior to spot welding.

9. A method of superplastically forming a reinforced panel as in claim 8, with further steps of tack welding each of the titanium and each of the aluminum shims to the core prior to assembly.

10. A method of superplastically forming a reinforced panel as in claim 7, with further step of selecting the core material from a wire mesh.

11. A method of superplastically forming a reinforced panel as in claim 7, with further step of forming the grid patterned core material from a metal sheet.

12. A method of superplastically forming a reinforced panel as in claim 7, with further steps of laying out a first set of wires parallel to each other, placing a second set of wires on top of and at 90 degrees from the direction of the first set of wires, spot welding while pressing the wires together at each intersection to form the grid patterned core.

13. A method of superplastically forming a reinforced panel as in claim 12, with further steps of tack welding the aluminum shims to the core, and tack welding a titanium shim at each core joint opposite an aluminum shim prior to placing the core between the core plates.

* * * * *